United States Patent [19]

Lindgren et al.

[11] Patent Number: 5,303,801
[45] Date of Patent: Apr. 19, 1994

[54] BRAKE ASSEMBLY HAVING AN ADJUSTABLE YOKE

[75] Inventors: Richard P. Lindgren, Chester Springs, Pa.; Melbourne F. Giberson, 5 Spring Mill La., Haverford, Pa. 19041

[73] Assignee: Melbourne F. Giberson, Haverford, Pa.

[21] Appl. No.: 16,729

[22] Filed: Feb. 11, 1993

[51] Int. Cl.$^5$ .............................................. F16D 65/24
[52] U.S. Cl. ................................. 188/73.34; 188/73.2
[58] Field of Search ................... 188/73.2, 73.4, 73.34, 188/368, 369, 71.3, 71.4; 303/2

[56] References Cited

U.S. PATENT DOCUMENTS

| | | | |
|---|---|---|---|
| 3,584,717 | 6/1971 | Suppes et al. | 188/73.34 |
| 3,964,583 | 6/1976 | Montalvo, Jr. | 188/73.34 |
| 4,428,621 | 1/1984 | Taki et al. | 303/2 |
| 4,696,377 | 9/1987 | Richardson et al. | 188/170 |

FOREIGN PATENT DOCUMENTS 1450492 9/1976 United Kingdom ............. 188/73.34

OTHER PUBLICATIONS

Blueprint Dawing, Brake Assembly-#9430267 Goodyear Tire & Rubber; Feb. 1957.
Blueprint Drawing, Brake-Hydraulic Fluid Driver Unit #PO 1330-1; 1330-2 Mar., Apr. 1962 Goodyear Tire & Rubber.

*Primary Examiner*—Matthew C. Graham
*Attorney, Agent, or Firm*—Polster, Lieder, Woodruff & Lucchesi

[57] ABSTRACT

In a brake system for a boiler feed water pump wherein a flat-sided brake disc is mounted on a rotating shaft, arms are hingedly mounted on a base frame at the lower end of each arm, the arms being positioned at diametrically opposite sides of the disc, the base frame extending between the lower ends of the arms, calipers are mounted on the arms to embrace diametrically opposite areas of the sides of the disc. A yoke is mounted on the upper ends of the arms in such a way as to be easily dismounted. The yoke is conventional. When it is desired to repair the calipers or to remove one of the shafts upon which the brake disc is mounted or with which it is integral, with the shaft and disc not rotating, as when the unit is out of service, it is only necessary to remove the yoke, and swing the arms out away from the disc. The brakes can easily be inspected and repaired, as well. The brakes are actuated by an intensifier system, in which an intensifier is connected to a valve which is connected to a reservoir. When the valve is opened, the pressure in the hydraulic line to the brake is monitored, and if it is below the desired pressure, the intensifier is caused to repeat, to pull hydraulic fluid into the intensifier, hence to the brake line, and to the brake calipers, causing the calipers to brake the disc and shaft to a stop, and to hold it stopped indefinitely.

8 Claims, 4 Drawing Sheets

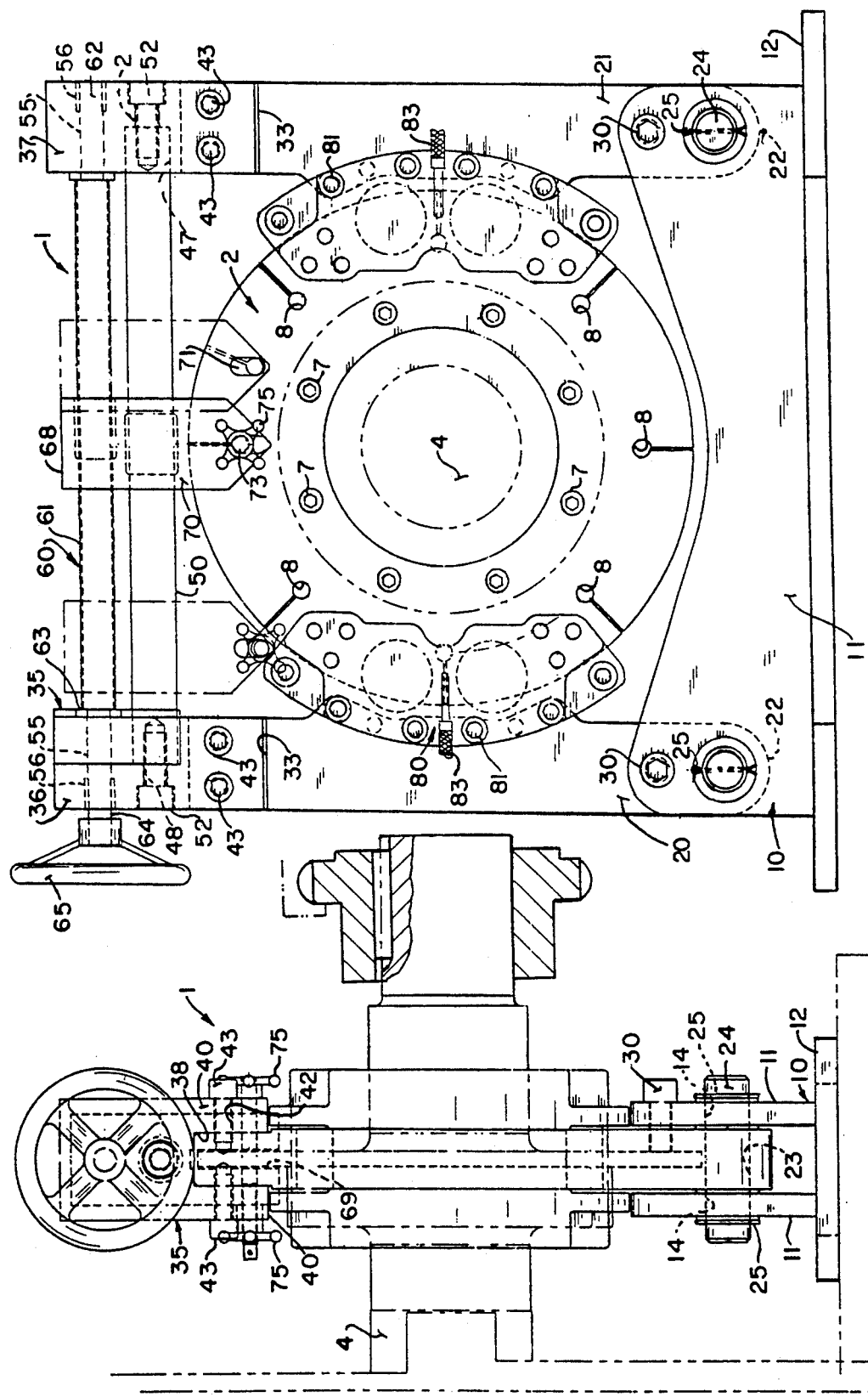

BRAKE ASSEMBLY HAVING AN ADJUSTABLE YOKE

BACKGROUND OF THE INVENTION

The brake system of this invention comprises a hydraulically operated, caliper type brake intended for a very special application; it is to be positioned over the brake disc which is mounted on the output shaft of a fluid drive, between the fluid drive and a boiler feed water pump of the type used in connection with the boiler of an electric power plant.

Conventionally, a separate hub is mounted on the output shaft with a shrink fit, and the brake disc is keyed or bolted to the hub. Such arrangements usually cause the shaft to bow, causing imbalance and resultant vibration when rotating.

Conventional brake systems are generally of one of two designs. The first is an electro-magnetic brake wherein the stationary components completely surround the shaft. In this case, the output shaft and the entire magnetic brake mechanism must be removed from the fluid drive to do inspection and/or maintenance, on either the output shaft or the brake. The second is an air over hydraulic design which has fixed uprights with a removable yoke, for the manually operated mechanical brake. The shaft with the brake disc can be removed after removal of the yoke. However, inspection and/or replacement of the calipers is difficult because the vertical uprights are fixed. Also, in such a conventional system, a multiplicity of hydraulic brake actuators and pads, for example, four, are mounted on the fixed upright or stanchion, the pads being arranged in an arc, generally along the lower half of the brake disc. This tends to induce lateral forces on the disc and shaft, hence, on the bearings of the output shaft.

An example of conventional air over hydraulic device is shown in FIG. 3, where a complete device 130 is shown as having a fixed, one-piece stanchion 131 with two upright arms 132 and a lower, central reach 133 with an arcuate upper surface 134. The stanchion 121 is fixedly mounted on a base 135. Four caliper brakes 136, mounted on the stanchion 131, are spaced in a semicircle around the bottom half of a brake disc 137 bolted to a hub 145 which is mounted with a shrink fit to an output shaft 146. The calipers 136 are supplied with hydraulic fluid from a master cylinder 138, connected by fluid line 139 that also communicates with an accumulator 140. The individual calipers are connected serially or in parallel, or both, by a connecting fluid line 141 to the line 139. In this arrangement, if there is a leak in the line 141 or 139, the master cylinder acts once, and if insufficient pressure is brought to the calipers, the brake cannot stop, or cannot continue to hold the disc stopped, and hence the brake will fail.

The purpose for having a brake on the output shaft of a fluid drive is to aid in the operation of the boiler feed pump by stopping the boiler feed pump shaft and to keep it from rotating when the pump is out of service, but when the driver, usually a steam turbine-generator, remains in service. There are certain boiler feed pumps that are designed and built in ways that will cause them to gall and consequently to seize if they rotate for more than a few seconds or a few minutes at low speed with no or low flow of water through them. Typically, these pumps have stainless steel components that can rub together. They are often, although not always, high performance, high pressure pumps.

Continued use of a boiler feed pump over a period of years permits the operators to establish if the pump has seized at low speed when the pump was out of service and a brake was not being applied. For those pumps that either have seized under low speed and flow conditions, or for which the manufacturer advises against operation at low speeds and low flow, it is imperative that a brake be employed when the driver is a steam turbine-generator. For those boiler feed pumps which have not seized when they were operated at low speed for several hours, or for which the manufacturer indicates that no problem will arise by operating at low speed with low to no flow, or which, generally, are motor driven, the brake is not required.

The speed and developed horsepower of the output shaft of a fluid drive depends upon the position of the scoop tube and the amount of circuit oil flow. This is discussed at some length in a co-pending application of Melbourne F. Giberson, Ser. No. 07/998,959, and broadly speaking, is well known in the art.

Usually, the hydraulic and mechanical brake systems in use presently can stop and hold the output shaft/coupling/boiler feed pump if the following conditions are met:

1) the scoop tube tip clearances are properly set;
2) the scoop tube is intact, not broken off:
3) the scoop tube linkage internal and external to the fluid drive is intact;
4) the scoop tube is kept at the minimum power position, i.e. at its maximum radial reach;
5) the circuit oil flow is at a minimum;
6) no vane is broken at either the impeller or runner;
7) the gap between the impeller and runner is properly set;
8) the journal and thrust bearings are not worn to the point at which the impeller and runner are touching, either axially or radially;
9) the brake disc is intact;
10) the calipers are not excessively worn;
11) the hydraulic brake system is not leaking oil; and
12) the hydraulic brake is designed to stop the shaft and to keep the shaft from rotating, assuming that the control power remains on.

Conventionally, a mechanical pin, usually made of high strength alloy steel, is inserted through a hole in the brake disc and through one of the slots in a holding block fixed against rotation with the disc. However, the pin, like the brake itself, is not designed to withstand the torque of the turbine shaft of a large turbine. For example, in a three hundred thirty megawatt unit at full load, the available power of the output shaft is four hundred forty thousand horse power; for a seven hundred fifty megawatt unit, the available power is a million horse power. Clearly, a pin or a caliper type brake is not going to keep the shaft from rotating against such torque.

Historically, for those fluid drives that have brakes, the brake is one of the highest maintenance items; they cause many of the forced outages. The brakes fail for a variety of reasons, usually when one or more of the conditions listed above is violated, with the result that the brake is not able to keep the shaft from rotating.

The fluid drive has first priority on the steam power, ahead of the generator, regardless of whether the fluid drive is on the turbine end or on the generator end of the machine.

Reported failures of brakes are innumerable. Pins have been sheared, calipers worn out in a few seconds, brake discs glow red hot, brake discs are broken and scattered. Accordingly, if the brake does not need to be applied in order to prevent the pump from galling and seizing, then the brake should be removed. If the brake does need to be applied in order to prevent the pump from galling and seizing, then the brake should be used, but used sparingly and kept in excellent condition.

As has been indicated, the brake system does not provide assurance of safety for maintenance of any form, no matter how simple, no matter how short in duration. The only purpose for which the brake is installed is to aid in the operation of the boiler feed pump.

In the brake systems known heretofore, the brakes have been configured and installed in such a way that the brakes have had to be disassembled either for maintenance of the brakes or for removal of the output shaft from the fluid drive with the brake disc on it.

One of the objects of this invention is to provide an improved hydraulic brake system that is more reliable than brake systems now in use;

Another object is to provide a brake system in which the brake elements are more easily disassembled in order to service the calipers or pads of the brake, or to remove the output shaft of a fluid drive.

Another object is to provide an improved hydraulic caliper brake system in which vibration and lateral forces are minimized;

Other objects will become apparent to those skilled in the art in the light of the following disclosure and accompanying drawing.

BRIEF DESCRIPTION OF THE INVENTION

In a brake system for a boiler feed water pump in which a flat-sided brake disc is mounted on the output shaft of a fluid drive, arms, hingedly mounted on a base frame at their lower ends, are positioned on either side of the brake disc, diametrically, facing one another. The base frame extends between the lower ends of the arms. Caliper brakes are mounted diametrically opposite one another with respect to the brake disc, intermediate lower and upper ends of the arms to embrace the two side surfaces of the disc. In the preferred embodiment, the arms themselves constitute a part of the hydraulic caliper brake units, serving in lieu of the usual spacers between facing caliper pads.

A conventional traveling block assembly is removably mounted on the upper ends of the arms. This consists of journal blocks, in which and extending between which a stabilizer bar is mounted, above which in the embodiment described, a lead screw, also extending between the mounting blocks, is journaled in the mounting blocks. One end of the lead screw projects beyond the mounting block in which it is journaled, and is provided with a hand-wheel. The traveling block is slidably mounted on the stabilizer bar, and threadedly mounted on the lead screw, to move back and forth between the mounting blocks in response to the turning of the lead screw by the hand wheel. The traveling block has a channel in it, defined by a pair of spaced plates, preferably integral with the rest of the traveling block, which straddle the brake disc through at least part of their travel, and a pair of aligned slots opening through the channel-defining walls in a direction perpendicular to the channel, through which a pin can be passed when the slot is coincident with a hole through the brake disc. Conventionally, there are eight such holes in the brake disc, uniformly spaced in a circle radially inboard from and concentric with the outer peripheral edge of the brake disc. In this arrangement, no matter where the disc stops, the traveling block can be cranked to a position at which the slots are coincident with a hole, to permit the pin to be inserted to hold the disc in one position when the brake is released after it has brought the rotation of the shaft to a stop and the pin has been inserted.

In the preferred embodiment shown and described, the hub on which the brake disc is mounted is integral with the output shaft of the fluid drive. This eliminates the problem of shaft distortion that accompanies the shrinking on of the hub.

Also in the preferred embodiment, an intensifier is provided, and a repeater and hydraulic fluid reservoir whereby the hydraulic pressure supplied to the brake is multiplied by an air piston which, in response to low pressure in the hydraulic line, reciprocates to pump hydraulic oil into the system to ensure that the brake is applied and held at the desired pressure even if there is some line leakage. The pressure will remain at the desired level until the reservoir is empty.

As has been indicated heretofore, in order to perform maintenance on the boiler water feed pump, it is necessary, for safety's sake to disconnect the turbine-generator from the boiler feed pump, as by removing the coupling between the turbine generator and the fluid drive, removing the coupling between the fluid drive and the boiler feed pump or installing a disconnect coupling between the turbine-generator and fluid drive and have it disengaged.

DRAWINGS

In the drawings, FIG. 1 is a view in front elevation of a brake assembly of this invention;

FIG. 2 is a view in side elevation of the device shown in FIG. 1, viewed from left to right in that Figure;

DESCRIPTION OF THE PREFERRED EMBODIMENT

Figure 3:
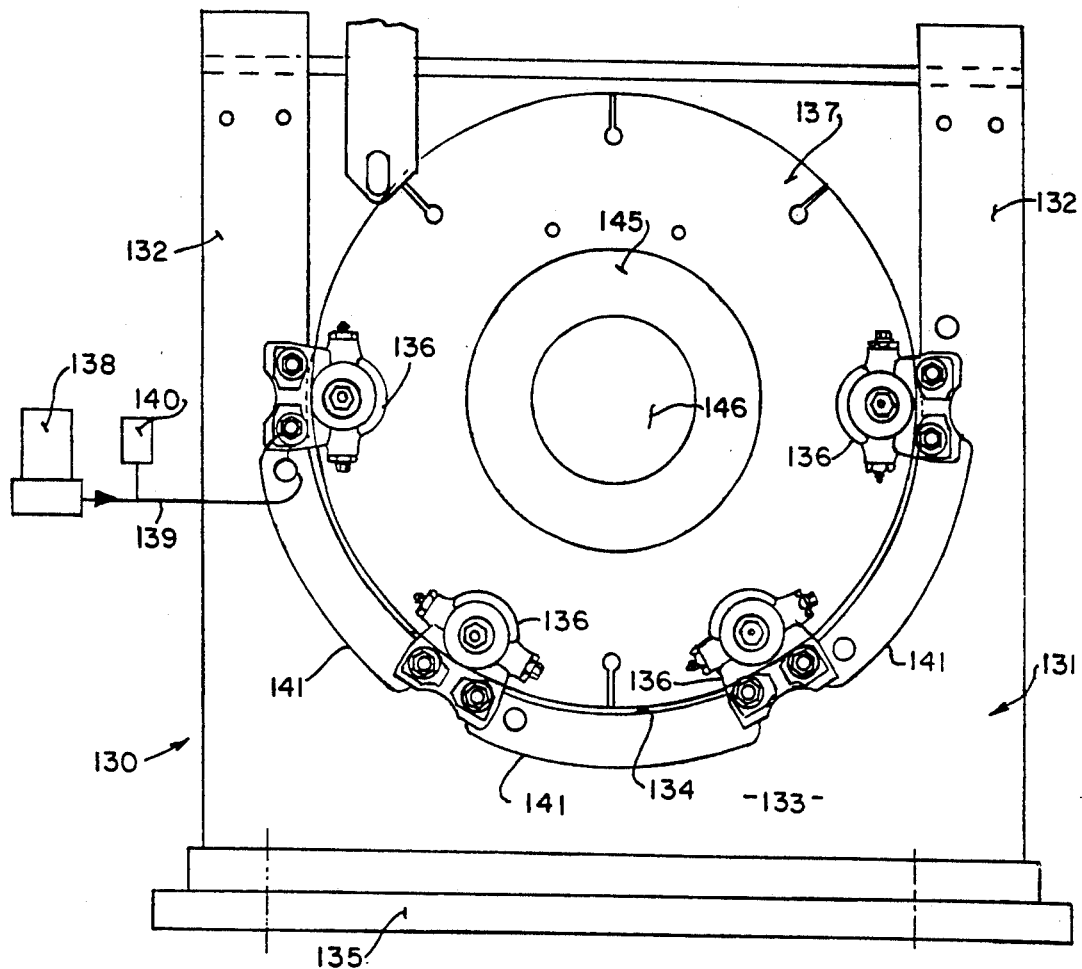
FIG. 3 is a view in front elevation of a conventional brake system.

Referring now to the drawings for one illustrative embodiment of brake assembly of this invention, reference numeral 1 indicates the entire assembly. The assembly includes a removable brake disc 2, mounted on a hub 3 integral with a fluid drive output shaft 4, by means of cap screws 7. The output shaft has a suitable coupling arrangement beyond the hub 3, by which it is coupled to boiler feed water pump shaft, not here shown. The brake disc 2 has eight holes 8 spaced uniformly from one another in a circle concentric with the center of the disc and therefore of the axis of rotation of the shaft 4, radially inward of the periphery of the disc.

Below the disc, and centered with respect to it, is a base 10, made up of spaced parallel side plates 11 welded to a base plate or weldment 12, which is wider at its two ends than at its center section, to give space to permit its being bolted to a heavy fixed frame, not here shown.

The side plates 11 have a concave upper surface, to clear the disc 2 to facilitate installation of the assembly. At the two high ends, the plates have transversely aligned pivot holes 14, on the order of an inch and one half (1½") in diameter, and above them, on one side, an erecting pin passage 16, on the order of half the diameter of the pivot pin holes.

Caliper arms 20 and 21, mirror images of one another, have a radiused lower end 22, above which is a pivot pin passage 23 of the same diameter as the pivot holes 14 in the side plates 11 of the base. An erecting pin passage 26 extends through the caliper arms above the pivot pin passage in the same relative position vertically as the erecting pin passage 16 in one of the plates 11. The passage 26 is tapped through its full length, to make the caliper arms 20 and 21 interchangeable. A pivot pin 24 fits slidably but closely within the passages 14 in the side plates, and the passage 23 of the caliper arm. The usual spacing washers are positioned around the pin between the inside surfaces of the side plates and the caliper arms, and between the outside surfaces of the side plates and cotter pins 25 which extend through diametric holes in the pins 24. Cap screws 30, passing through the erecting pin passage 16 of the side plates and threaded into the cap screw passage 26 of the respective caliper arms, serves to hold the caliper arms vertical when that is desired, as will be explained hereinafter.

Figure 5:
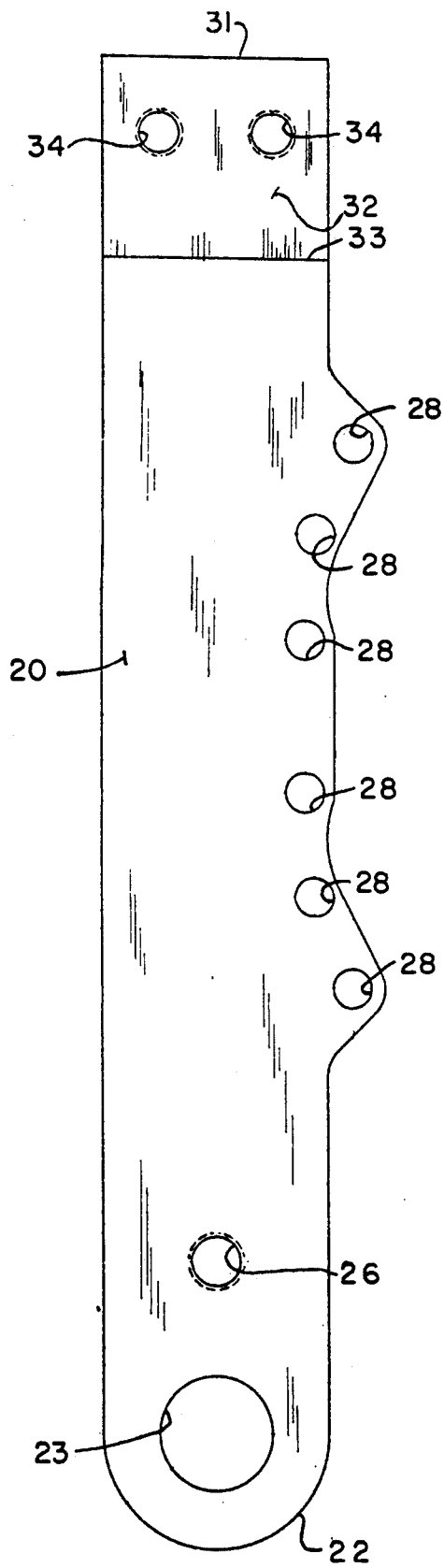
FIG. 5 is a view in front elevation of a caliper arm of the assembly shown in FIGS. 1 and 2.
Figure 6:
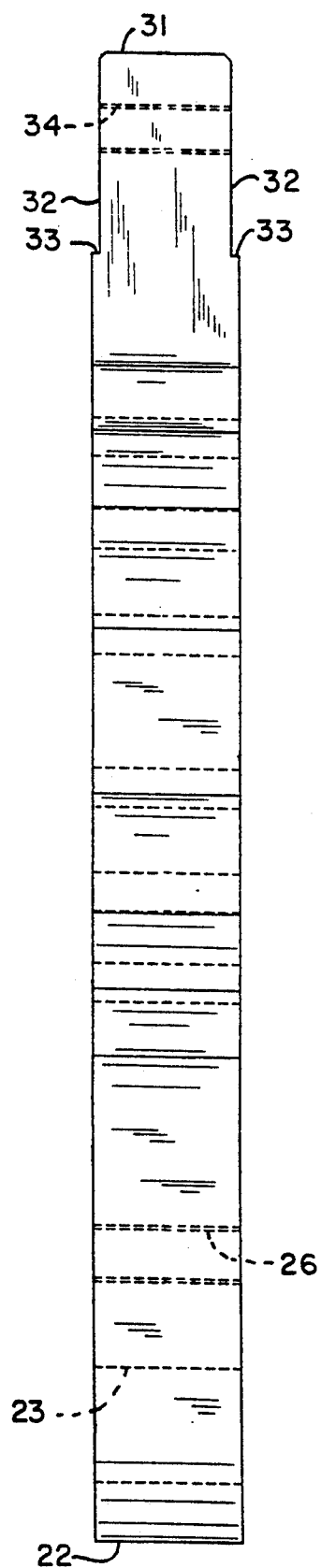
FIG. 6 is a view in side elevation of the arm shown in FIG. 5.

The outboard vertical edges of the caliper arms 20 and 21 are substantially planar. The inboard, facing, edges of the caliper arms are contoured as shown particularly in FIG. 5, and are provided with bolt holes 28. The caliper arms 20 and 21 have substantially square upper end walls 31, chamfered along their long edges as shown in FIG. 6. A neck section 32 extends from the upper end 31 a relatively short distance along two broad faces of the arms, as shown in FIGS. 5 and 6, to provide a locating shoulder 33 on each side. A pair of spaced, transversely aligned mounting holes 34 extend through the arms in the neck section and are tapped through their lengths.

A yoke 35 is mounted on the upper ends of the caliper arms 20 and 21. Yoke 35 includes a pair of head or journal blocks 36 and 37, each with a channel 38, defined by spaced parallel legs 40 which closely straddle the neck 32 of each arm. The legs 40 have mounting holes 42, complementary to the holes 34 in the arms, through which socket head cap screws 43 extend to thread into the holes 34. Head block guide rod sockets 47 are formed above the channel 38 in the head blocks 36 and 37. A counterbored cap screw passage 48, coaxial with the socket 47 communicates with the socket 47 and extends through the opposite face of the blocks 36 and 37. A guide rod 50, uniformly cylindrical through its length, is bored and tapped at either end 2. The ends of the guide rod 50 are seated in the guide rod sockets 47, and securely mounted therein by means of cap screws 52, extending through the passages 48 and threading into the threaded bores of the guide rod.

Each of the head blocks has a lead screw passage 55 through it, parallel to the axis of the guide rod 50, and counterbored to receive bushings 56. A lead screw 60, with a threaded central section 61, has at one end an axle 62, smoothly cylindrical and of less diameter than the center section 61, journaled in one of the bushings 56. A spacer-washer 63 is positioned on the axially inboard side of the block 37. At the other end of the lead screw 60, a shaft 64, like the axle 62, integral with the center section 61, is long enough to project beyond the bushing 56, so that a hand wheel 65 can be mounted on its end.

A traveling lock block 68 is threadedly mounted on the lead screw 60 and slidably mounted on the guide rod 50, as shown particularly in FIGS. 1 and 2. The block 68 has a channel 69 side walls of which are defined by plates 70, spaced to straddle the disc 2 through a part, at least, of the travel of the block along the lead screw 60. The plates 70 are vertically long enough to cover one or more of the holes 8, no matter where the rotation of the disc is stopped, as illustrated in FIG. 1. Vertically elongated slots 71 in the two legs are aligned in the axial direction of the shaft 4 and are sized to admit a pin 73, threaded at its two ends to receive star wheels 75, which serve to keep the pin in the slot when the traveling block is clear of the disc and to hold the pin in the slot and disc hole when the pin is inserted as shown in FIG. 1.

Referring now to FIGS. 1, 4, 5, and 6, hydraulic calipers 80 are mounted on the caliper arms 20 and 21 by means of bolts 81 extending through bolt holes in the caliper casings and through the bolt holes 28 in the caliper arms. The calipers 80 can be standard paired calipers, such for example as an AUSCOL hydraulic caliper Model 31551, Style 4. The caliper arms 20 and 21 serve as the spacers between the pairs of calipers. The calipers embrace a portion of the smooth parallel sides of the disc 2, radially outboard of the circle of cap screws 7. It will be observed that only two paired calipers are employed, and that they embrace the disc 2 symmetrically about a diametric line parallel with the base 10. The use of the caliper arms themselves as spacers and the construction and operation of the caliper brakes is conventional. Hydraulic fluid, carried by flexible hoses 83 is supplied to operate the calipers. However, the supply of hydraulic fluid to the calipers is, in this embodiment, different from the supply of hydraulic fluid to such brakes known heretofore.

Figure 4:
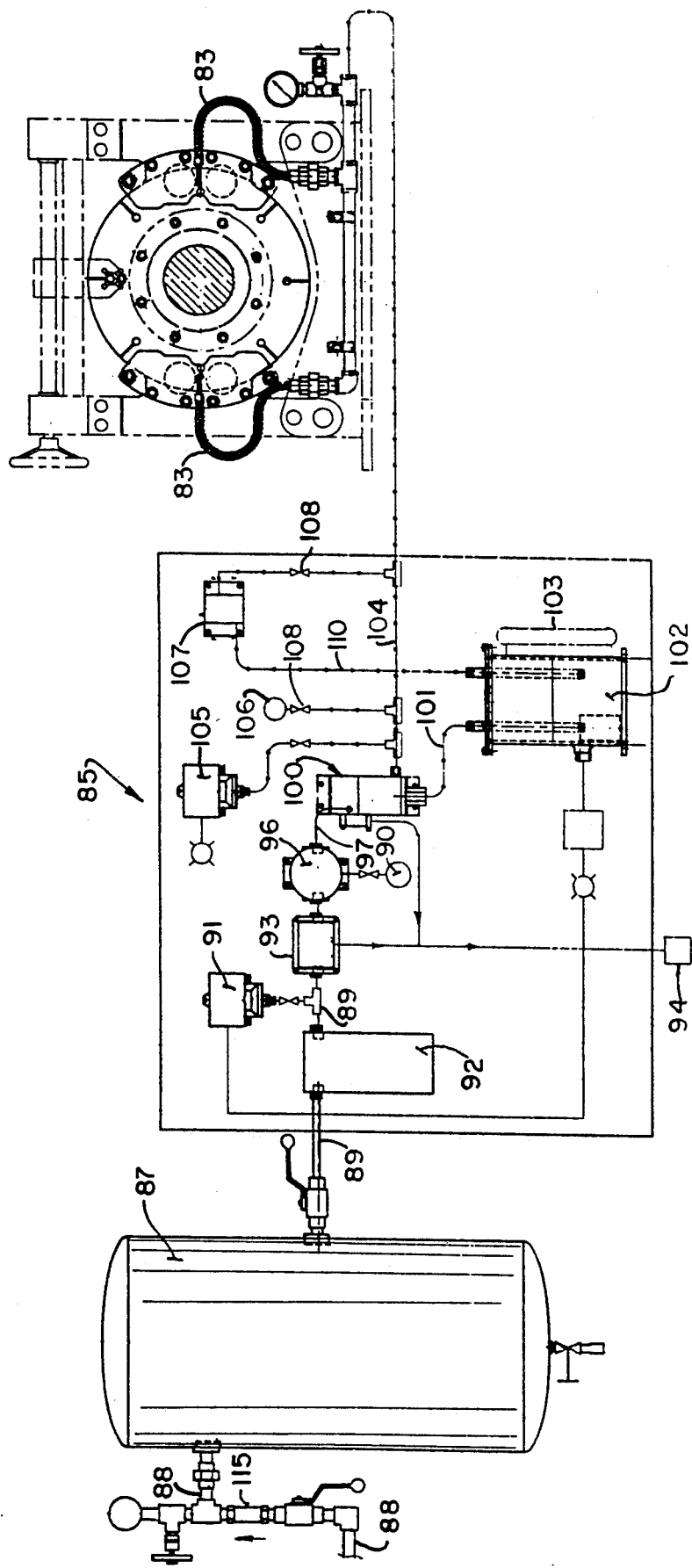
FIG. 4 is a somewhat diagrammatic view of an intensifier system with an air reservoir used in connection with the brake assembly shown in FIGS. 1 and 2.

The hydraulic fluid in the embodiment shown comes from an intensifier system 85, shown in FIG. 4. The system includes an air reservoir 87, to which air under pressure is supplied from the regular plant compressed air source through a line 88 and from which air under pressure is supplied to a pressure line 89. The pressure line 89 communicates by way of a filter 92 with a solenoid operated air valve 93, which communicates with an exhaust muffler and with an air pressure regulator 96. An air line 97 from the pressure regulator communicates with an air cylinder of an intensifier 100. The intensifier 100 is essentially an air piston of a large surface area driving a much smaller hydraulic fluid piston, thus multiplying the amount of pressure. The hydraulic fluid (oil) forced from the intensifier 100 is delivered to the calipers by way of a caliper fluid line 104. The intensifier is connected by an oil supply line 101 from an oil reservoir 102, equipped with a sight glass 103. The line 104 is operatively connected to a solenoid operated brake release valve 107, through a manual valve 108, to a pressure indicator 106, and to a pressure switch 105. The brake release valve 107 has a return line 110 to the reservoir 102. The air pressure line 89 is also operatively connected to a pressure switch 91, and the pressure regulator 96 is connected to a pressure indicator 90.

The intensifier 100 is designed with an internal switch so that if the pressure of hydraulic fluid in the line 104 is less than it should be at the end of the stroke of the air driven piston, the piston is returned, by venting the compressed air above the piston through the muffler 94, and oil is drawn from the reservoir 102 into the hydraulic cylinder of the intensifier 100, to repeat the process until the brakes are applied with the desired force. The air pressure in the air reservoir is at the normal pressure from the air supply system of the power house or other industrial source, for example, 60 to 100 psi. The quantity of compressed air in the tank represents stored energy in a quantity sufficient to apply the brakes even in the event of total failure of the plant air supply system. A check valve 115 prevents the return of air to the plant air systems.

The air pressure applied to the intensifier 100 is controlled by the air pressure regulator 96, which is supplied by air from the air reservoir through the filter 92. Adjusting the discharge air pressure from the air pressure regulating valve adjusts the hydraulic pressure applied to the brakes, in the ratio built into the intensifier.

The intensifier 100, solenoid operated air supply valve 93 and solenoid operated brake release valve 107 are conventional, commercially available components. Intensifiers are regularly used in heavy off the road trucks and certain manufacturing operations, but, to applicants, knowledge, never as described herein.

Once the yoke 35 is assembled, it can remain assembled. When the entire system is in the condition shown in FIGS. 1 and 2, if it is desired to hold the disc from rotating for a long period of time to ensure against galling of the boiler feed water pump elements, the pin 73 is removed from the slots 71 and the hand wheel 65 is rotated until the slots 71 of the traveling block 68 are aligned with a hole 8. The pin 73 is then inserted through the slots and the hole 8, and the star wheels 75 are screwed down to hold the pin.

If it is desired to remove the shaft 4 or to work on the calipers 80, it is only necessary to remove the cap screws 43 and the pin 73, if it is in place, and lift the yoke 35 from the ends of the caliper arms. The holding cap screws 30 are then removed, and the arms 20 and 21 can be swung back away from the disc, to permit removal of the shaft and disc or the inspection or repair of the calipers.

The use of the intensifier system 85 provides fast and more certain actuation of the calipers 80 than has been the case heretofore, because it accommodates situations in which the oil pressure to the calipers may drop because of leakage at the seals of the calipers, or any of the line fittings or joints, for example.

When the repair or replacement of the various elements has been accomplished, and it is desired to restore the brake to its operating condition, it is only necessary to swing the arms 20 and 21 upright, when the caps screws 30 can be inserted to hold them in proper position. The yoke 35 is then put into place, the shoulder 33 serving as support and guide. The cap screws 43 are then put into place and the assembly is complete.

Numerous variations in the construction of the brake assembly of this invention will occur to those skilled in the art in the light of the foregoing disclosure. Merely by way of example, particular piping and layout of the intensifier system 85 can be modified. In the illustrative embodiment, the disc is seventeen inches in diameter and one-half inch thick, the caliper arms, about twenty inches long, two inches thick, and three and three fourths inches wide at the wings of the contoured center section. The air reservoir of the intensifier system has a capacity of thirty gallons, and the hydraulic fluid reservoir, at least one gallon. All of these dimensions can be varied to suit the application. Instead of the dual caliper arrangement on each arm shown and described, a single, large caliper can be used on each side, or a multiplicity of calipers can be used, but to accomplish the result of the preferred embodiment, in whatever form, each of the calipers should have a corresponding caliper on the other arm arranged so that the two calipers engage opposite surfaces of the disc symmetrically about a diametric line, to minimize distortion of the shaft. These are merely illustrative.

We claim:

1. In a brake system for a boiler feed water pump driven by an output shaft of a fluid drive, wherein a brake disc with parallel flat sides is mounted on said output shaft, the improvement comprising a fixed base frame having a part extending substantially horizontally along a lower edge of said brake disc and having at each end, an elevated section; two arms, each hingedly mounted on a pivot pin mounted in said fixed base frame at a lower end of said arm for swinging between an upright position substantially perpendicular to said base frame, said arms facing each other on diametrically opposite sides of said disc, and a position at which the arms are swung outwardly with respect to one another, said base elevated sections and said arms having erecting pin passages above said pivot pins, in which erecting pins are mounted when the arms are in their upright position to hold the arms in upright position, a yoke extending between the upper ends of said arms, and means for selectively connecting said yoke to said arms in precisely determined relative position, each of said arms having an intermediate span contiguous said disc when said arm is in its upright position, and hydraulically operated caliper brake means mounted on said intermediate span and having calipers embracing a portion of both outer side surfaces of said disc when said arms are in upright position and swinging clear of said disc when said arms are swung away from said disc, the calipers of said two arms engaging the sides of said plate at diametrically opposite positions with respect to one another.

2. The improvement of claim 1 wherein two caliper brake means are mounted on each of said arms, calipers of said caliper brake means of the two arms embracing said disc symmetrically on diametrically opposite portions of said disc.

3. The improvement of claim 1 including a reservoir of hydraulic brake fluid, a source of air under pressure, and intensifier means connected to said source of air, to said fluid reservoir and to said hydraulically operated brake.

4. The improvement of said claim 3 including means for causing said intensifier means to reciprocate in response to low pressure in said hydraulic operated brake system, to pump oil from said reservoir and into said hydraulically operated brake system.

5. The improvement of claim 1 including a hub integral with said fluid drive output shaft, said brake disc being removably mounted directly to said hub by means of cap screws.

6. The improvement of claim 1 wherein the base comprises spaced parallel side plates, the elevated ends of which extend at each end beyond the periphery of the disc, said arms being mounted between said parallel side plates, said elevated ends and arms having pivot pin holes through them through which said pivot pins extend to mount said arms and erecting pin passages above said pivot pin holes through which said erecting pins extend to hold said arms in upright position, and said yoke has parallel depending legs embracing the upper ends of said arms, and means for selectively mounting said arms between said legs.

7. The improvement of claim 6 wherein the arms are necked at their upper end to define a plane-sided section extending between said yoke legs and a shoulder complimentarily configured and positioned to serve as a locating means for said yoke legs.

8. In a brake system for a boiler feed water pump wherein a flat-sided brake disk is mounted on a rotating shaft, the improvement comprising arms, each hingedly mounted on a base frame at a lower end of said arm, said arms being positioned at diametrically opposite sides of said disk, said base frame extending between said lower ends of said arms, means for restraining said arms in a position with an intermediate span of said arms contiguous said disk and for releasing said arms for rotation away form said disk, and hydraulically operated caliper brake means mounted on said arms and embracing a portion of outer side surfaces of said disc when said arms are in restrained position and swinging clear of said disc when said arms are swung away from said disc, said restraining means comprising a yoke removably mounted on and extending between the upper ends of said arms said yoke including journal blocks removably mounted on said upper ends of said arms, a stabilizer bar and an externally threaded feed screw revolvably journaled in said journal blocks, means for rotating said feed screw and a vertically elongated traveling block having a passage through it internally threaded to receive and run on said feed screw, said brake disc having holes spaced around it radially inboard from the perimeter, and said traveling block projecting beyond said perimeter and having a slot extending on the long direction of said traveling block to coincide with a hole in said disc when said disc is stopped.

* * * * *